United States Patent [19]

Stemme et al.

[11] 4,171,886

[45] Oct. 23, 1979

[54] CAMERA FOR INSTANT PICTURES

[75] Inventors: Otto Stemme, Munich; Peter Lermann, Narring, both of Fed. Rep. of Germany

[73] Assignee: AGFA-Gevaert, A.G., Leverkusen, Fed. Rep. of Germany

[21] Appl. No.: 791,984

[22] Filed: Apr. 28, 1977

[30] Foreign Application Priority Data

Apr. 29, 1976 [DE] Fed. Rep. of Germany ....... 2618988

[51] Int. Cl.² .................. G03B 17/04; G03B 17/42; G03B 17/52
[52] U.S. Cl. ..................... 354/86; 354/192; 354/204
[58] Field of Search ................. 354/83–86, 354/187, 192–194, 204, 208, 212, 219, 288, 180

[56] References Cited

U.S. PATENT DOCUMENTS

| 1,110,116 | 9/1914 | Dietz | 354/208 |
| 3,677,160 | 7/1972 | Harvey | 354/83 |
| 3,906,521 | 9/1975 | Ueda | 354/86 |
| 4,041,510 | 8/1977 | Kern | 354/86 X |

Primary Examiner—John Gonzales
Attorney, Agent, or Firm—Michael J. Striker

[57] ABSTRACT

A camera body has mounted on it a lens mount which is pivotable relative to the camera between an operative and an inoperative position. A mechanism in the camera is activated and transports film from the camera film chamber through the camera during movement of the lens mount from one to the other (or from the other to the one) of the aforementioned positions.

7 Claims, 9 Drawing Figures

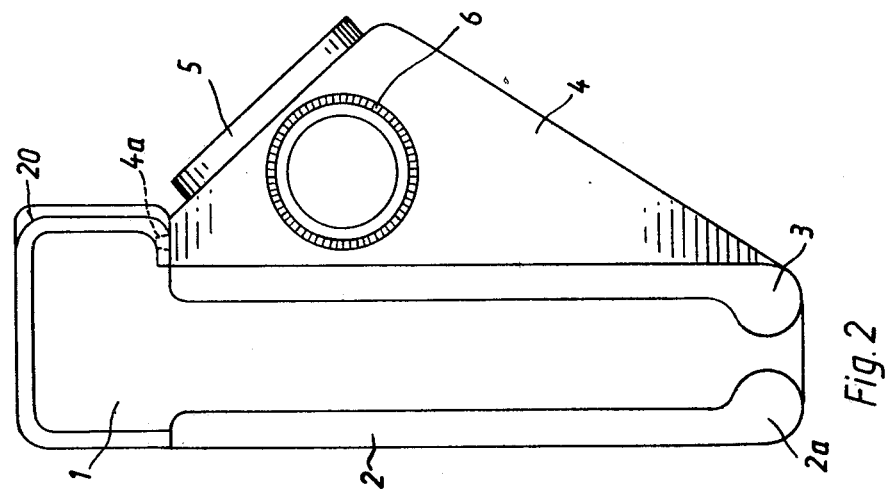
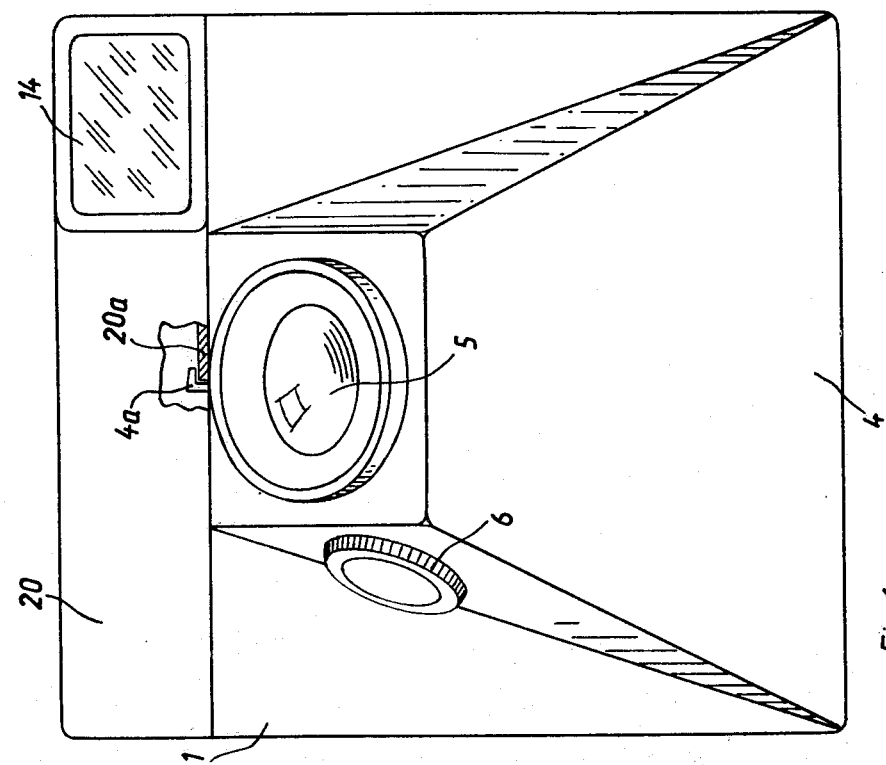

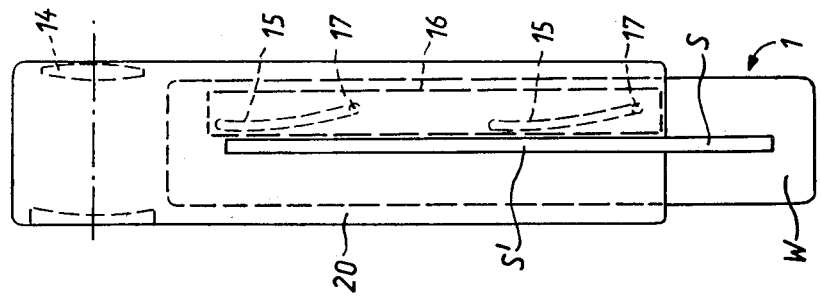
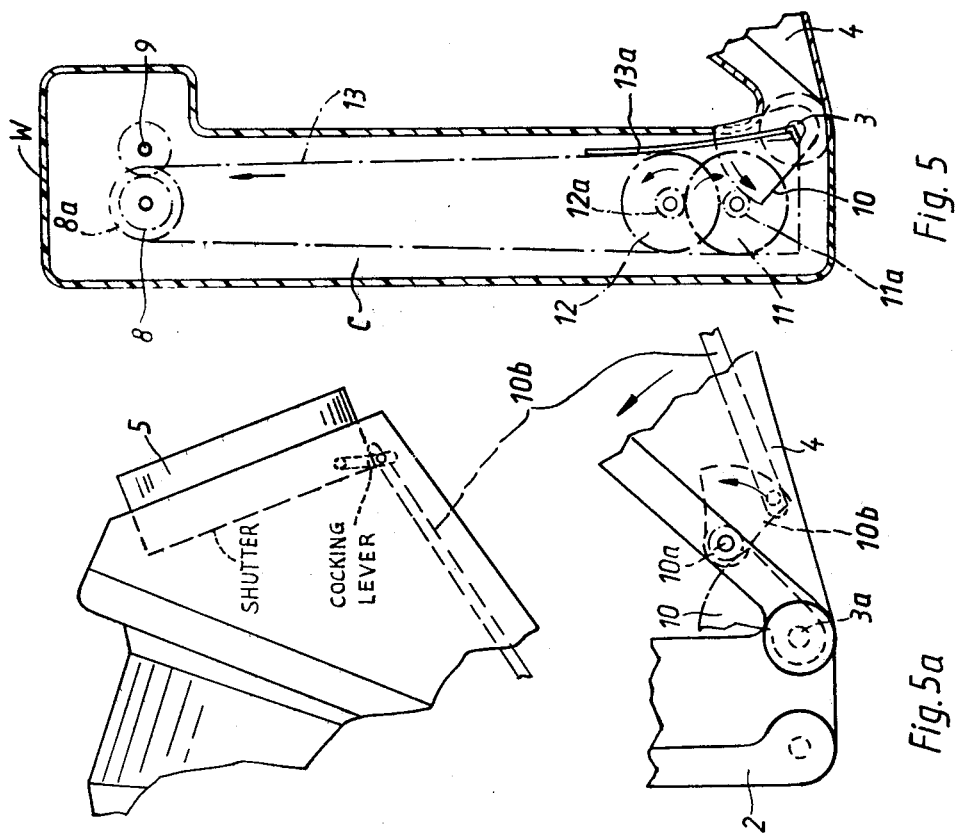

CAMERA FOR INSTANT PICTURES

BACKGROUND OF THE INVENTION

This invention relates to a camera, and more especially to a camera for instant pictures.

In prior-art cameras of this type the film is transported through the camera by having the user pull a tab which projects from the camera. More recently it has been proposed to drive the developer rollers either with a motor or manually, so as to make them advance the film. The suggested manual means include cranks or sliders; in all such instances the cameras have had to be constructed very strongly to withstand the relatively strong forces acting upon the body during operation of the manual means.

SUMMARY OF THE INVENTION

It is an object of the invention to overcome the prior-art drawbacks.

A more specific object is to provide a camera of the type in question in which the film-transporting forces are applied in such a manner that the camera can be of the open-and-shut type without becoming damaged by these forces.

A concomitant object is to provide such a camera wherein the film-transporting mechanism is relatively uncomplicated and very reliable.

In pursuance of these objects, and of still others which will become apparent hereafter, one feature of the invention resides in a camera, particularly an instant-picture camera, having a camera body provided with a film chamber for film to be exposed, a lens mount connected to the body and movable relative thereto, transporting means for transporting film out of the film chamber, and means for operating the transporting means in response to movement of the lens mount relative to the body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a front view of a camera according to the invention in collapsed (i.e. rest) position;

FIG. 2 is a side view of the camera in the position of FIG. 1;

FIG. 5 is a fragmentary vertical section through a part of the camera body, illustrating interior components;

FIG. 5a is a fragmentary vertical section, on an enlarged scale, illustrating a detail of a shutter-cocking mechanism;

FIG. 6 is a top-plan view of the camera in the position of FIG. 3;

DESCRIPTION OF A PREFERRED EMBODIMENT

Figure 7:
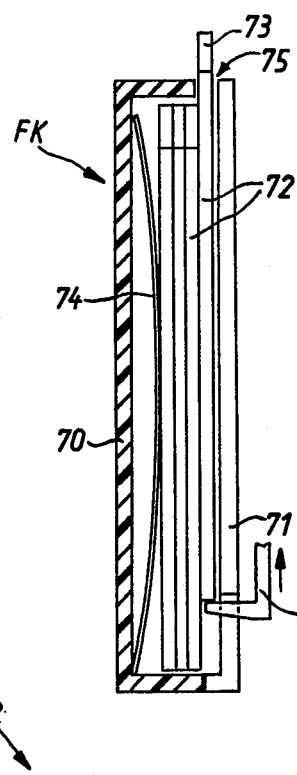
FIG. 7 is a section through a film pack.
Figure 8:
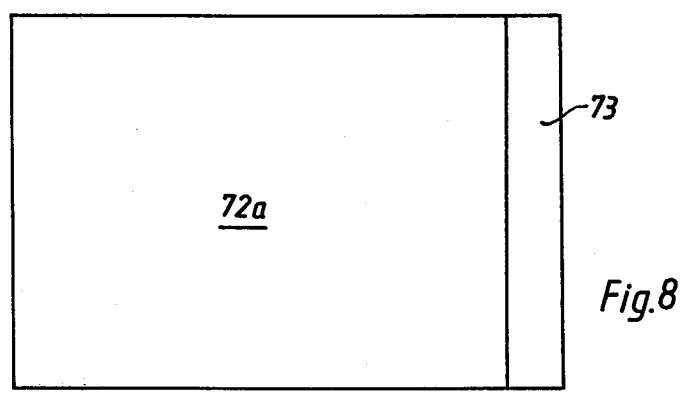
FIG. 8 is a plan view of a single film sheet of the type accommodated in the film pack.

Before discussing the camera as illustrated in FIGS. 1-6, a discussion of the film pack and film sheets shown in FIGS. 7 and 8 will be helpful to facilitate understanding of the invention. It should be borne in mind that the film pack and film sheets shown in these Figures are not new and do not form a part of the invention; they are being discussed only to make it clear why it is advantageous for the novel camera to be able to accept the film pack in a certain orientation.

With this in mind it will be seen that the film pack FK (FIG. 7) has a casing 70 the front side of which is provided with an opening, cutout or the like 71. One end of the casing 70 has a slit 75 through which the film sheets 72 which are stored in the casing (and exposed through opening 71) are expelled from the casing. A spring 74 (or equivalent biasing means) usually is provided to feed the sheets towards the opening 71 and thus into a position in which they can be withdrawn through the slit 75.

Along one of its narrow sides each of the rectangular film sheets 72 has a pouch or compartment 73 (FIG. 8) which contains a supply of developer. Suitable rollers squeeze the developer out of the compartment 73 subsequent to exposure of the film sheet 72 and spread it onto the same to effect developing of the image. The finished photograph will have a surface area corresponding to the portion 72a of the film sheet; along one narrow edge it will have a blank (i.e. non-image-bearing) portion corresponding in size and outline to the (now empty) pouch 73. This is aesthetically least objectionable if it is located at the bottom of the photograph; i.e. if it is in the position which it will assume if one rotates the sheet 72 in FIG. 8 through 90° in clockwise direction.

With this information as background, the camera of the invention—as shown in FIGS. 1-6—will now be discussed. It should be understood, however, that the invention is concerned with the film transport and considerations herein as to the orientation and discharge of the film sheets are not primary.

Figure 4:
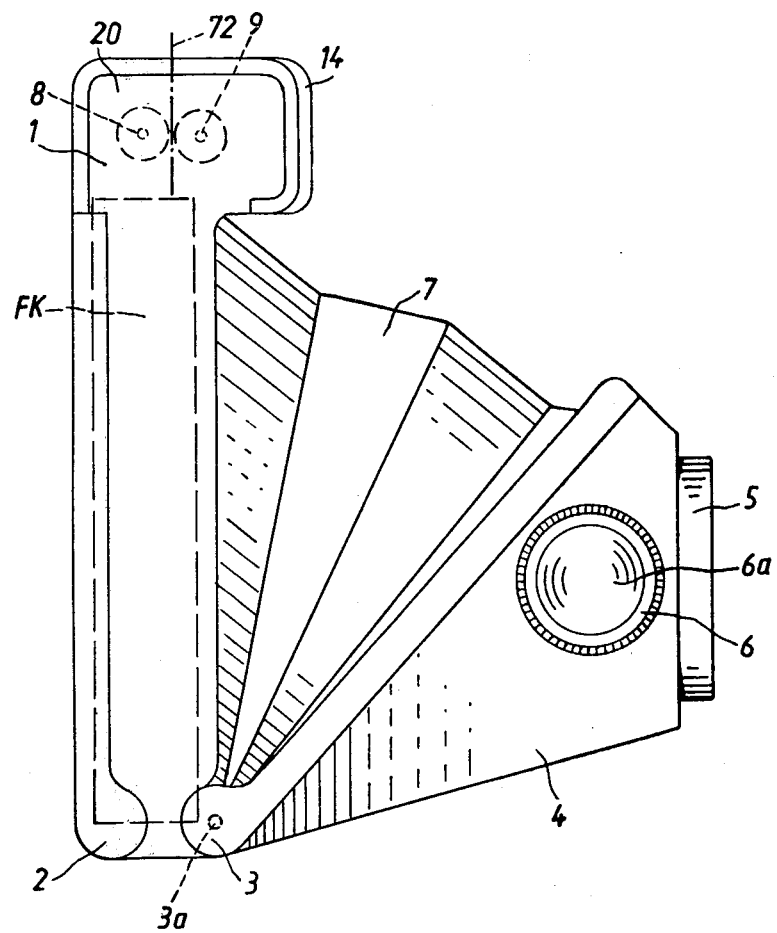
FIG. 4 is a side view of the camera in the position of FIG. 3.

The camera has a body 1 the interior of which forms a film chamber C (FIG. 5) which is accessible via a cover or door 2 that is hinged to body 1 at 2a, or which can be otherwise secured thereto. As shown in FIG. 4, the film chamber is so dimensioned that it can receive the film pack (film cassette) FK in upright position, i.e. in the position of FIG. 7 in which the pouches 73 of the film sheets 72 in pack FK are located uppermost.

Since the developer must be squeezed from the pouches 73 so that it can spread over the area of the portion 72a (FIG. 8), a pair of developer rollers 8 and 9 is provided in the upper part of body 1; the film sheets 72 must pass between these rollers (FIG. 4) which squeeze the developer out of the pouches 73.

From the rollers 8, 9 the film sheets 72 then exit through the slot S provided in the upper wall W of the camera body 1 (see FIG. 6). This arrangement, i.e. the fact that the film sheets travel in this manner to exit in vertical direction from the slot S, makes it possible to obtain photographs in which the blank strips resulting from squeezing-dry of the pouches 73, are located at the bottom end of the respective photograph. In other words, the strip 73 emerges first through the slot S and is followed by the upside-down photograph.

Photographs made with the film sheets 72 are relatively large; the camera, however, is desired to be as small as possible, at least in its rest position, i.e. when it is not in use. According to the invention this is achieved by making the camera collapsible between the open position of FIG. 4 and the closed position of FIG. 2. For this purpose the objective (lens) 5 (together with its not-illustrated shutter) is mounted on a rigid carrier or lens mount 4. One edge portion 3 of the mount 4 is secured to the lower end of body 1 for pivoting about the axis 3a. A foldable bellows 7 is connected to the body 1 and to the mount 4 with which latter resembles (in the open camera position) essentially the shape of a truncated pyramid.

Figure 3:
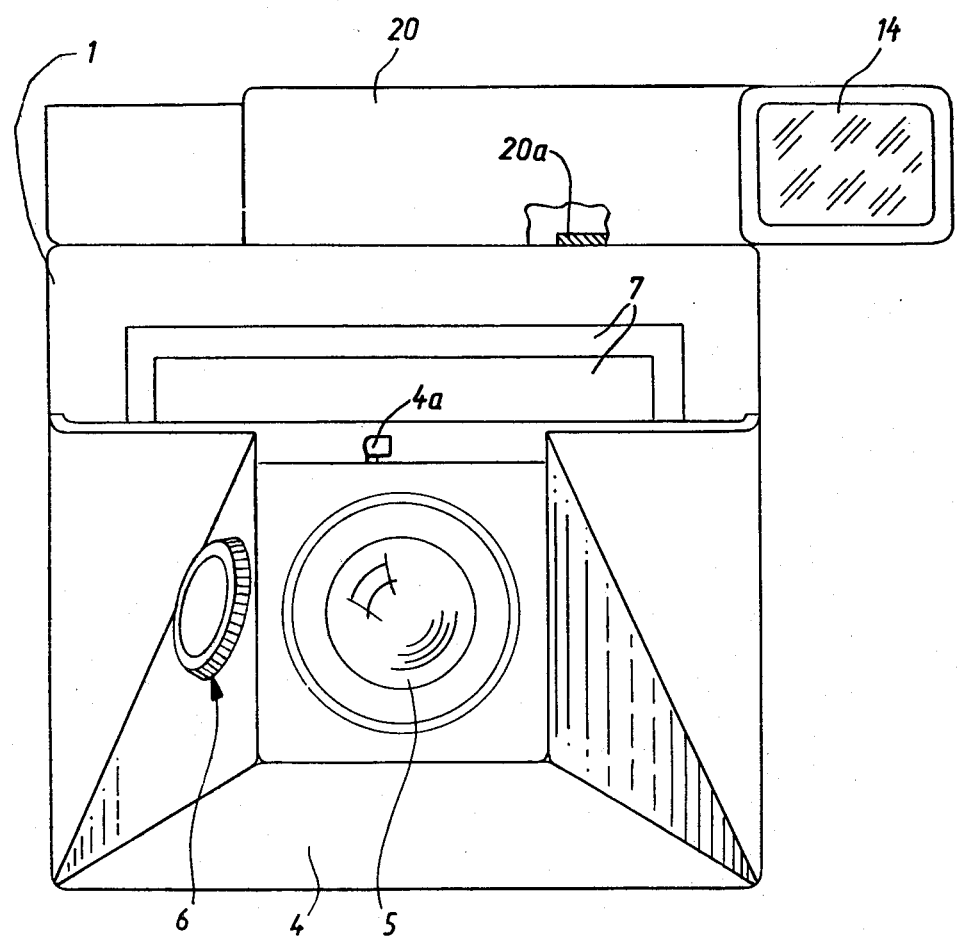
FIG. 3 is a front view of the same camera, but illustrating it in open (i.e. operative) position.

A cap 20 of channel-shaped cross-section (preferably of a cross-section resembling an inverted letter U) straddles the upper end of body 1 and is slidable transverse to the optical axis of lens 5 (i.e. normal to the plane of FIG. 4). In the closed position of the camera the cap 20 coextends with the upper end of body 1 (FIG. 1); when the camera is opened and cap 20 is shifted to the position of FIG. 3, one end portion of the cap projects laterally beyond the body 1 (FIG. 3). This end portion has mounted in it a viewfinder 14 (preferably of the direct-view or eyelevel type as seen in FIG. 6) which is exposed for use when the cap is in the position of FIG. 3 but is blocked by the body 1 when the cap assumes the position of FIG. 1. Thus, when the camera is in the closed position of FIG. 1, the viewfinder 14 requires no additional space because it does not project beyond the outline of the camera.

The cap 20 is provided with a slot S' for passage of the pictures (i.e. of the exposed film sheets 72) which exit through slot S of body 1. The inner surface of the top wall of cap 20 has guide grooves 15 which are located laterally of the slots S'; below this top wall is located a plate 16 which is slidable lengthwise of the optical axis of lens 5 (i.e. transverse to the elongation of cap 20) and for this purpose is guided in grooves (not shown) of cap 20 or otherwise slidably held therein (it could be guided on the top surface of body 1 instead). The plate 16 has pins or other projections 17 which extend into the grooves 15 (evidently, the pins could be on cap 20 and the grooves on the plate 16). The grooves 15 are curved in such a manner (FIG. 6) that when cap 20 is shifted from the position of FIGS. 3, 6 to the position of FIG. 1 (i.e. when the camera is placed in rest or storage position) this results in automatic movement (due to the cooperation of grooves 15 and pins 17) of the plate 16 from a position laterally adjacent the slots S, S' to a position in which the plate lies directly above slot S and below slot S', thus blocking slot S and protecting it against the entry of dust and other contaminants.

Control elements are provided on the rigid lens mount 4, i.e. on the peripheral wall which bounds the hollow interior of this mount. In the illustrated embodiment these elements comprise a knurled turnable knob 6 which is connected in a manner known per se (and therefore not illustrated) to the lens so as to permit focus adjustments; set into the center of knob 6 (not necessarily turnable therewith) is a shutter release 6a, for example of the diaphragm type (known per se) which is connected with the not-illustrated shutter mechanism that is accommodated in the interior of the lens mount 4.

A transmission is provided for driving at least one of the rollers 8, 9 so as to cause these (nip) rollers to advance the film sheets 72 through slots S, S' while squeezing developer from the respective pouches 73. For this purpose a gear segment 10 is secured on lens mount 4 (FIGS. 5, 5a) to turn about the axis 3a when the lens mount is pivoted about the same. Segment 10 meshes with a pinion 11a of a gear 11 which in turn meshes with a pinion 12a of another gear or sprocket 12. A toothed belt is trained about sprocket 12 and about a sprocket of one of the rollers 8, 9 here about sprocket 8a of roller 8. Thus, roller 8 is rotated when sprocket 12 turns. A freewheeling device (known from some cameras with rapid film wind levers and therefore not illustrated) or another device allowing movement of transporting rollers only in one direction, as known from U.S. Pat. Nos. 2,830,776 or 2,682,999 e.g., is provided which assures that roller 8 is rotated only when the lens mount 4 pivots either towards open position or—preferably—towards closed position. Since the rollers 8, 9 must squeeze developer from the pouches 73, which requires a certain amount of force, it is advantageous if the arrangement is such that motion is transmitted to roller 8 when the lens mount 4 is pivoted to its closed position, since a user can exert greater force when closing the camera than when opening it. A gripper (e.g. hook) is provided which pulls successive film sheets 72 from the film pack FK and feeds them to the rollers 8, 9. The gear segment 10 can also be utilized (FIG. 5a) to cock the (not illustrated) shutter mechanism. For this purpose it may mesh with a pinion 10a of a second gear segment 10b which is turnably mounted inside the lens mount 4 and which in turn meshes with a further gear (not shown) or which moves a rod 10b from which motion is transmitted to the shutter-cocking mechanism. This transmission of motion by segment 10 to pinion 10a advantageously takes place when the camera is being opened, i.e. during movement of lens mount 4 from the position of FIG. 1 to the position of FIG. 4 (see the arrow on segment 10b) but it could also take place during the closing movement. In the latter case, however, the user would have to supply sufficient force both to drive the roller 8 and to cock the shutter mechanism which is somewhat burdensome (because tiring).

The cap 20 has the additional purpose of locking or latching the lens mount 4 in the closed position of the camera (FIG. 1). For this purpose suitable hooks 4a and eyes 20a or equivalent detent portions are provided (not shown).

It will be evident that when the camera is in closed position all of its sensitive components—such as slot S and bellows 7—are fully protected. The lens 5 may be provided with a separate snap-on or screw-on cover for protection. Biasing means (e.g. a leaf spring) may be provided which permanently bias the lens mount 4 towards the open position shown in FIG. 4, so that the camera opens automatically when the cap 20 is moved from the position of FIG. 1 to the position of FIG. 3 with concomitant disengagement of the detent portions. Because the bellows 7 necessitates pressure compensation, air channels (not shown) are provided which communicate the interior of the camera with the atmosphere. Mechanisms for preventing double exposures and the like are also provided; these are known per se and form no part of the invention. The same is true of a shutter-release lock which is activated when the camera is placed in closed position.

The invention is susceptible to various modifications. For example, the arrangement for rotating the rollers 8 and/or 9 can be constructed differently from the one which is illustrated. What counts is that it be of such construction that the relatively small (pivotal) movement performed by lens mount 4 when the same is moved between the open and closed position is transformed into a rotational movement of rollers 8 and 9 which lasts long enough for these rollers to transport the respective film sheets 72 over the entire length of the same, i.e. to draw them through and expel them upwardly from the nip defined between these rollers.

While the invention has been illustrated and described as embodied in an instant-picture camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a camera, particularly an instant-picture camera, a combination comprising a camera body provided with a film chamber for film to be exposed; a rigid hollow lens mount connected to said body and pivotable relative thereto about a pivot axis between a camera-opening and a camera-closing position; biasing means permanently biasing said lens mount towards said camera-opening position; locking means for locking said lens mount in said camera-closing position; transporting means for transporting film out of said chamber, including a pair of nip rollers; means for operating said transporting means and linking said mount with at least one of said nip rollers to rotate the same only in response to movement of said lens mount to said camera-closing position, including a gear segment turnable about said axis in unison with said lens mount, and a toothed belt driven by said gear segment and transmitting motion to said one nip roller; and means cooperating with said gear segment and operative, when said gear segment is pivoted, for cocking a shutter mechanism of the camera.

2. A combination as defined in claim 1, wherein said lens mount is a rigid, hollow and light-tight casing of frusto-pyramidal shape having a larger end facing said camera body and a smaller end; and a lens mounted on said smaller end.

3. A combination as defined in claim 2, said lens mount having a rigid peripheral wall and including hinge means securing said peripheral wall to said body for movement about said pivot axis.

4. A combination as defined in claim 3; and further comprising light-impermeable wall means connecting said larger end with said camera body.

5. A combination as defined in claim 4, wherein said wall means comprises a foldable bellows of flexible material.

6. A combination as defined in claim 3, wherein said lens mount comprises control means for at least said lens, said control means being mounted on said peripheral wall.

7. A combination as defined in claim 5, wherein said lens mount covers said bellows when said lens mount is in said camera-closing position.

* * * * *